April 15, 1941. W. M. W. THOMAS ET AL 2,238,574
CONTROLLING MEANS FOR REVERSING GEARS
Filed July 8, 1939 2 Sheets-Sheet 1

INVENTORS William Miles Webster Thomas
Howard Snook
By Joseph J. Juhasz
Attorney.

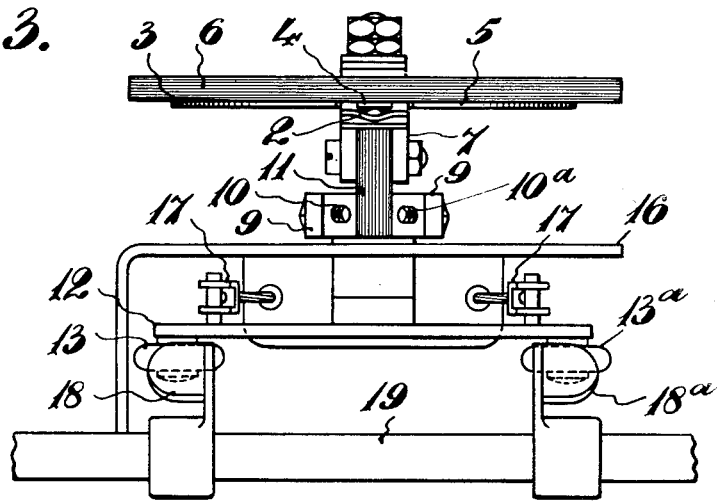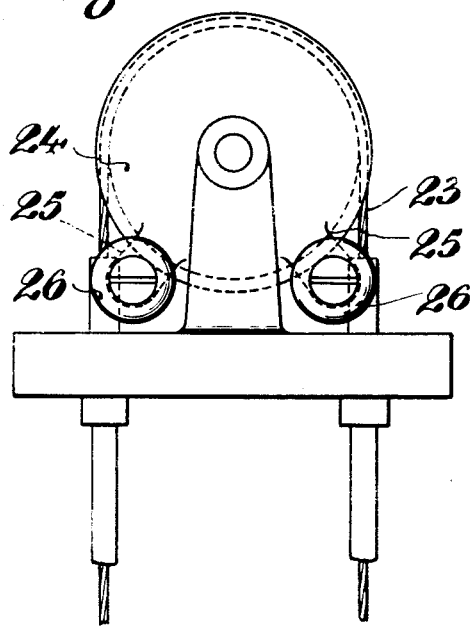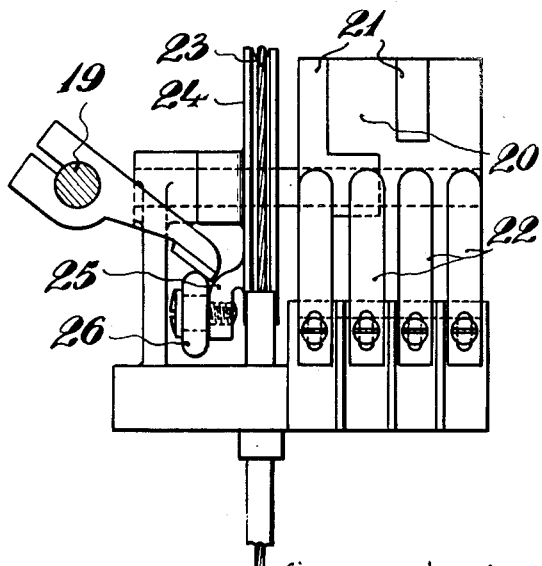

Patented Apr. 15, 1941

2,238,574

UNITED STATES PATENT OFFICE 2,238,574

CONTROLLING MEANS FOR REVERSING GEARS

William Miles Webster Thomas and Howard Snook, Birmingham, England, assignors to Wolseley Motors Limited, Birmingham, England, a company of Great Britain Application July 8, 1939, Serial No. 283,370
In Great Britain June 7, 1939

7 Claims. (Cl. 74—472)

This invention relates to reversing gears of that kind which are controlled by electro-magnets selectively excited by a switch device, to cause a driven shaft to revolve either in a clockwise or anti-clockwise direction, and the invention, although relating to reversing gears of this kind for general application, has particular reference to electro-magnetic reversing gears for use on power driven watercraft.

The object of the invention is to provide a simplified control mechanism for the reversing gear and for the engine or power unit.

According to the invention the switch device for selectively exciting the electro-magnets of the reversing gear is operated by an actuating member or lever which also controls the engine or power unit. The electro-magnets may be selectively excited, to cause the driven member or shaft to revolve in either a clockwise or anti-clockwise direction, by moving the actuating member or lever to either side of a central position, movement of the said actuating member or lever in either direction also controlling the engine or power unit. The latter may consist of an internal combustion engine and the common actuating member or lever may operate a switch shaft for controlling the electro-magnets and carrying a rocking lever or part for co-operating with and actuating a shaft controlling the throttle of the engine. When the actuating member or lever is in a central or neutral position it may cause the excitation of an electro-magnet which holds the driven member or shaft of the reversing gear against rotation, and all of the electro-magnets may be energised by a contact blade on the switch shaft moving over suitably disposed contacts; or a switch device of any other suitable form may be provided.

Figure 1 of the accompanying drawings is a front elevation of one arrangement which may be employed for actuating by a single lever, in accordance with this invention, an electro-magnetically controlled reversing gear and an engine or power unit, the said lever being connected by a Bowden control to the shaft of the electro-magnet switch, the said shaft carrying a rocking lever for controlling the engine.

Figure 3 is a plan view of same.

Figure 4 is a front view of a modified arrangement applied to a different type of switch.

Figure 5 represents a side view of the said modified arrangement.

Figure 1:
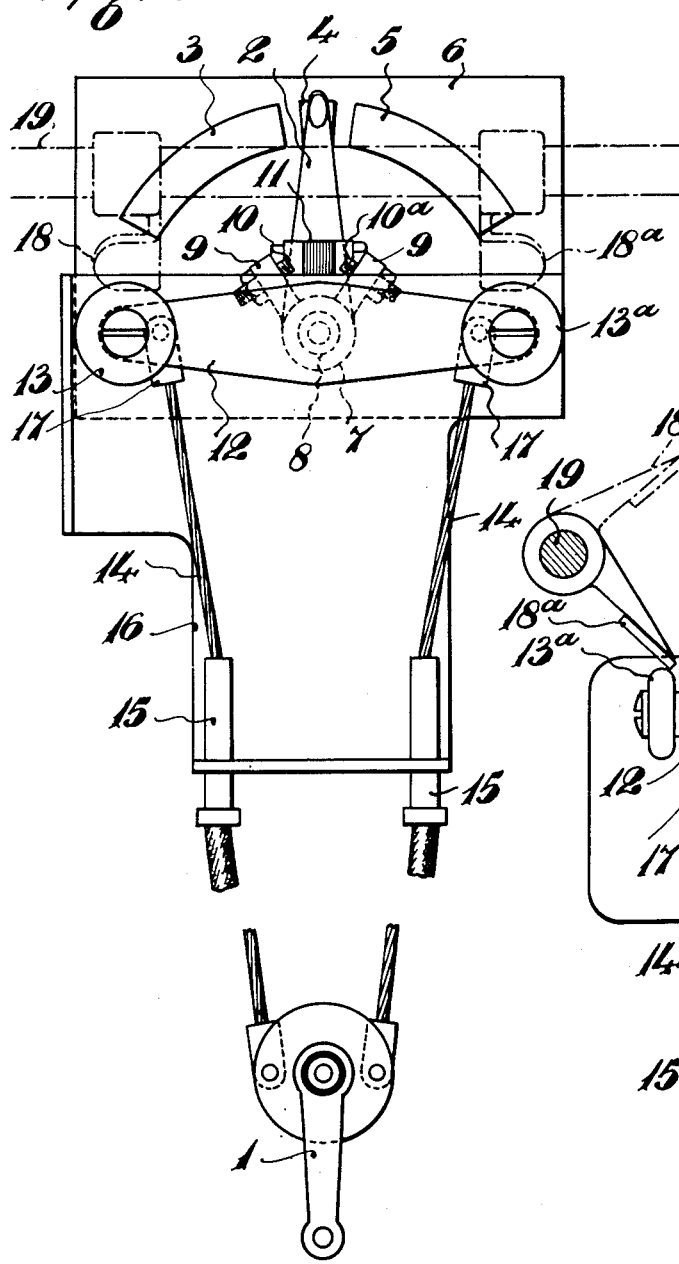
Figure 2:
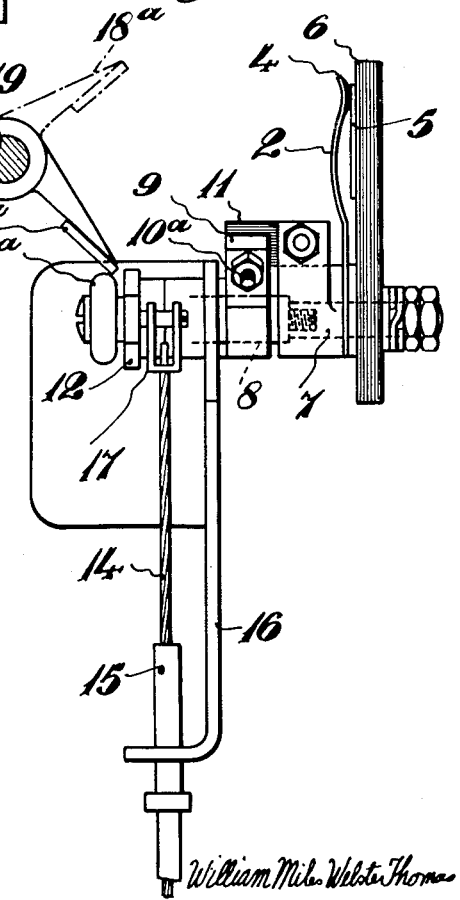
Figure 2 represents a side view of the arrangement.

Referring to Figures 1 to 3 of the drawings, the actuation of an electro-magnetically controlled reversing gear and also of an internal combustion engine constituting the power unit of, for example, a boat or other watercraft, is adapted to be effected substantially simultaneously by means of a single lever 1. The electro-magnets (not shown) of the reversing gear are controlled by a switch device comprising an angularly-movable contact arm or blade 2 engaging, and movable over, separated contacts 3, 4 and 5 carried by a panel 6 of insulating material and connected to the respective electro-magnets, the contact 3 being connected, for example, to an electro-magnet for causing a clockwise rotation of a driven shaft operated by the engine and the contact 5 being connected to a magnet for causing the driven shaft to turn in an anti-clockwise direction. The electro-magnet which is connected to the intermediate contact 4, on the other hand, serves positively to hold the driven shaft against rotation, the contact arm or blade 2 being in its neutral position when engaging the said intermediate contact, and the engine throttle being closed, with the engine "idling." The said contact arm or blade 2 of the switch device is carried by a sleeve 7 capable of turning relatively to the shaft 8 within certain limits, whilst carried by the shaft 8 is a boss having a pair of lugs 9 fitted with screws 10 and 10ᵃ adapted respectively to engage opposite sides of a part 11 carried by the contact blade sleeve 7, the arrangement being such that when the switch shaft 8 is rotated in either direction the contact blade or arm 2 may be moved angularly in a similar direction, owing to the co-operation of one or other of the screws 10 or 10ᵃ with the part 11, so that it moves from the central contact 4 on to either the contact 3 or 5 and excites the respective electro-magnet. Fixed upon the forward end of the switch shaft 8 is a rocking lever 12, which extends for equal distances from opposite sides of the said shaft as shown, whilst carried by the ends of the said lever are rollers 13 and 13ᵃ. This rocking lever 12 is adapted to be operated by the lever 1, to turn the shaft 8 and the contact blade 2 in either direction, by means of Bowden wires 14, the latter passing, for example, through the sleeves 15 carried by the fixed plate 16, and being connected to suitable attachment parts, such as 17, on the ends of the lever 12. The engine speed and power output is controlled by a throttle shaft 19, and this shaft 19 is adapted to be operated by the rocking lever 12, whichever way the latter is turned, by one or other of the rollers 13 or 13ᵃ engaging an arm 18 or 18ª on the said shaft. The contact blade or arm 2 and the throttle control shaft 19 may thus both be operated together and substantially simultaneously by the single lever 1, the screws 10 and 10ª co-operating with the part 11 to provide a lost-motion device which enables the throttle control shaft 19 to be operated slightly in advance of the contact blade 2, the advance movement of the shaft 19 depending on the adjustment of the screws.

Thus, when the lever 1 is in the mid-way or neutral position illustrated the contact blade or arm 2 is arranged to be on the middle contact 4, so that the corresponding electro-magnet is excited and holds the driven shaft against rotation. In this position the engine throttle is closed and the engine "idling." If, for example, the lever 1 is moved to the left the lever 12 is rocked so that the roller 13 operates the throttle control shaft 19 and slightly opens the throttle in advance of the actuation of the contact blade or arm 2. Immediately, however, the screw 10 engages the part 11 the blade or arm 2 is moved on to the contact 5, thereby causing the electromagnet for rotating the driven shaft in an anti-clockwise direction to be energised, whilst further movement of the lever 1 in the same direction increases the throttle opening and the speed of the driven shaft. When the lever 1 is returned to its neutral or mid-way position the lever 12 is moved back owing to the lost-motion device, in advance of the contact arm 2 which remains on the contact 5 until the screw 10ª engages the part 11, and the arrangement is such that the contact blade or arm is moved back on to the contact 4 (although not to the middle of the said contact) by the time the lever 12 is returned to the position indicated in the drawings to cause the throttle control shaft to return to its closed position. The engine is then idling and, owing to the engagement of the blade 2 with the contact 4, the gear is again in neutral. Movement of the hand lever 1 in the other direction from its mid-way position, that is to the right, causes the lever 12 to be turned so that it operates the throttle control shaft 19 through the roller 13ª, the contact arm 2 moving on to the contact 3 to energise the electro-magnet which causes the driven shaft to rotate in a clockwise direction. This movement of the throttle control shaft also takes place in advance since the contact arm 2 has first to complete its movement over the intermediate contact 4 before it can reach the contact 3. The throttle can be again opened the amount required according to the extent to which the lever 1 is operated, the throttle being again moved back by its spring when the lever 1 is returned to its mid-way position.

If desired, a lost-motion device may be provided which causes the contact blade 2 to be moved in advance of the throttle control shaft; or, if required the lost-motion device may be dispensed with, the contact blade or arm and the throttle control rod or member being then operated simultaneously by the single lever.

In the modified arrangement illustrated in Figures 4 and 5 of the drawings, the electro-magnets of the reversing gear are controlled by a different form of switch comprising a rotary drum 20 having contacts 21 adapted to be engaged by relatively fixed spring blades 22, so as to cause the driven shaft of the reversing gear to turn in a clockwise or anti-clockwise direction, according to the position of the drum and the magnets which are excited, the drum when in a neutral or mid-way position causing an electro-magnet to be energised which holds the driven shaft stationary. The said drum 20 of the switch device is adapted to be actuated by a Bowden wire 23 passing over a pulley 24 and controlled by a single lever (not shown), the pulley 24 being fixed to the shaft which carries the drum. In order that the engine and the reversing gear may be operated together by means of the same lever, the pulley is provided with a pair of radial arms 25 having rollers 26 which are disposed beneath the arms on the throttle control shaft 19. The operation is substantially the same as in the preceding arrangement, and when the single control lever is turned in one direction or the other from a central or mid-way position the switch drum 20 is turned to cause the excitation of the appropriate electro-magnet of the reversing gear and the throttle control shaft 19 is at the same time actuated. No lost-motion device is shown in this arrangement.

The combined switches and throttle control mechanism above described may be operated from the single lever by any other suitable means instead of by Bowden wires. Also, any other suitable form of switch or throttle control mechanism may be provided and the invention is not necessarily limited to reversing gears for watercraft.

What we claim is:

1. Combination control apparatus for controlling an electro-magnetic reversing gear and an engine, comprising a pair of spaced and fixed forward and reverse contacts for connection to electro-magnets of the gear for giving forward and reverse speeds, an intermediate fixed contact connected to an electro-magnet for holding the driven shaft of the gear against rotation, a movable contact mounted so that it may engage the intermediate fixed contact, an engine controlling member, and an operating lever adapted to move the movable contact in either direction from the intermediate fixed contact on to the forward or the reverse contact and adapted also to actuate the engine controlling member during such movement of the movable contact in either direction from the intermediate fixed contact.

2. Combination control apparatus for controlling an electro-magnetic reversing gear and an engine throttle valve, comprising a pair of spaced and fixed forward and reverse contacts for connection to the electro-magnets of the gear, a movable contact adapted to take an intermediate position between the fixed contacts, a part supporting the movable contact, a rocking member on the movable contact supporting part for operating the engine throttle valve, and an operating device adapted to move the movable contact in either direction from the said intermediate position to engage one or other of the fixed contacts, and adapted to turn the rocking member so that it actuates the throttle valve for either direction of movement.

3. Combination control apparatus for controlling an electro-magnetic reversing gear and an engine throttle valve, comprising a pair of spaced and fixed forward and reverse contacts for connection to the electro-magnets of the gear, intermediate fixed contact for holding the driven shaft of the gear against rotation, a movable contact mounted so that it may engage the intermediate fixed contact, a rocking lever for actuating the engine throttle valve, and an operating device adapted to move the movable contact in either direction from the said intermediate contact to engage one or other of the fixed contacts the said operating device also turning the rocking lever to open the engine throttle.

4. Combination control apparatus for controlling an electro-magnetic reversing gear and an engine throttle valve, comprising a pair of spaced and fixed forward and reverse contacts for connection to electro-magnets of the gear, a movable contact mounted so that it may take an intermediate position between the fixed contacts, a rocking lever which operates the engine throttle valve when turned in a clockwise and anticlockwise direction, a part on the rocking lever which operates the movable contact with a delayed movement to move it on to the forward or reverse contact when the rocking lever is turned, Bowden wire control means, and a hand lever for actuating the rocking lever through the Bowden wire control means.

5. Combination control apparatus for controlling an electro-magnetic reversing gear and an engine throttle valve, comprising a pair of spaced forward and reverse contacts for connection to electro-magnets of the gear to give forward and reverse speeds, an intermediate contact connected to an electro-magnet for holding the driven shaft of the gear against rotation, a movable contact mounted so that it may engage the intermediate contact or be turned to engage either the forward or the reverse contact, a rocking lever adapted to operate the engine throttle valve when turned in a clockwise and in an anticlockwise direction, spaced parts carried by the rocking lever for operating the movable contact with a delayed action, forming a lost-motion coupling, so as to move the said contact on to the forward or the reverse contact when the rocking lever is actuated, and hand control means for actuating the rocking lever.

6. Combination control apparatus for controlling an electro-magnetic reversing gear and an engine throttle valve, comprising a rotatable shaft, a drum on the rotatable shaft, contacts on the drum, fixed contacts adapted to co-operate with the drum contacts to energise the electro-magnets and give forward or reverse drive, means for turning the drum in either direction from an intermediate position, an engine throttle valve control member, and parts moving with the drum for co-operating with the throttle valve control member so as to actuate the throttle valve when the drum is turned in either direction.

7. Combination control apparatus for controlling an electro-magnetic reversing gear and an engine throttle valve, comprising a rotatable shaft, a drum on the rotatable shaft, contacts on the drum, fixed contacts adapted to cooperate with the drum contacts to energise the electro-magnets and give forward or reverse drive, a pulley on the drum shaft, a cable passing around the pulley, a hand control adapted to turn the drum, through the cable and pulley, in either direction from an intermediate position, an engine throttle valve control member, and projecting arms on the pulley adapted to operate the throttle valve control member when the drum is turned in either direction.

WILLIAM MILES WEBSTER THOMAS.
HOWARD SNOOK.